(12) United States Patent  (10) Patent No.: US 8,080,795 B2
Scarpa et al.  (45) Date of Patent: Dec. 20, 2011

(54) DEVICE FOR IMAGING AND METHOD FOR PRODUCING THE DEVICE

(75) Inventors: Giuseppe Scarpa, Munich (DE); Paolo Lugli, Halbergmoos (DE); Pietro Regoliosi, Munich (DE); Florian Clever, Freiburg (DE); Jan Michalski, Munich (DE); Stephan Hirschsteiner, Munich (DE)

(73) Assignee: Technische Universitaet Muenchen (DE)

( * ) Notice: Subject to any disclaimer, the term of this patent is extended or adjusted under 35 U.S.C. 154(b) by 0 days.

(21) Appl. No.: 12/698,796

(22) Filed: Feb. 2, 2010

(65) Prior Publication Data

US 2010/0213372 A1    Aug. 26, 2010

Related U.S. Application Data

(63) Continuation of application No. PCT/EP2008/060191, filed on Aug. 1, 2008.

(30) Foreign Application Priority Data

Aug. 2, 2007 (EP) .................................. 07015154

(51) Int. Cl.
    *G01J 5/00* (2006.01)
(52) U.S. Cl. .................................................. 250/338.1
(58) Field of Classification Search ................ 250/338.1
    See application file for complete search history.

(56) References Cited

U.S. PATENT DOCUMENTS

| 5,188,985 | A | 2/1993 | Medeiros, III et al. |
| 5,615,032 | A | 3/1997 | Kalmanash et al. |
| 5,969,475 | A | 10/1999 | Friend et al. |
| 6,822,788 | B2 * | 11/2004 | Blitstein ........................ 359/350 |
| 6,985,281 | B2 | 1/2006 | Wagner et al. |
| 7,049,004 | B2 | 5/2006 | Domash et al. |
| 2003/0072009 | A1 | 4/2003 | Domash et al. |
| 2003/0132386 | A1 * | 7/2003 | Carr et al. .................. 250/338.1 |
| 2004/0234198 | A1 | 11/2004 | Wagner et al. |
| 2005/0037232 | A1 | 2/2005 | Tyan et al. |
| 2005/0105185 | A1 | 5/2005 | Ma et al. |

(Continued)

FOREIGN PATENT DOCUMENTS

CA    2548288 A1    5/2005

(Continued)

OTHER PUBLICATIONS

International Preliminary Report on Patentability and Written Opinion of the International Searching Authority; PCT/EP2008/060191; Feb. 2, 2010; 6 pages.

(Continued)

*Primary Examiner* — David Porta
*Assistant Examiner* — Mindy Vu
(74) *Attorney, Agent, or Firm* — St. Onge Steward Johnston & Reens LLC

(57) ABSTRACT

A device for imaging the local distribution of at least one thermodynamic variable includes a radiation emitter capable of emitting electromagnetic radiation and a filter for filtering electromagnetic radiation. The emitter and the filter form an arrangement adapted for modifying the electromagnetic radiation emitted by the emitter in dependency of the local distribution of at least one thermodynamic variable at the location of the arrangement. The emitter further includes at least one electroluminescent layer and the filter is provided with at least one filter layer. The electroluminescent layer and the filter layer are integrated within a cohesive sequence of layers. The device is particularly suitable for infrared camera systems.

19 Claims, 7 Drawing Sheets

U.S. PATENT DOCUMENTS

| | | | |
|---|---|---|---|
| 2005/0275342 A1* | 12/2005 | Yanagawa | 313/504 |
| 2006/0061257 A1* | 3/2006 | Nakamoto | 313/496 |
| 2006/0065833 A1 | 3/2006 | Craig et al. | |
| 2006/0110844 A1 | 5/2006 | Lee et al. | |
| 2006/0131506 A1 | 6/2006 | Shigenaka et al. | |
| 2006/0194415 A1 | 8/2006 | Lee et al. | |
| 2007/0023661 A1 | 2/2007 | Wagner et al. | |
| 2007/0029482 A1 | 2/2007 | Laou et al. | |
| 2007/0138391 A1 | 6/2007 | Garber et al. | |
| 2007/0176104 A1 | 8/2007 | Geneczko et al. | |

FOREIGN PATENT DOCUMENTS

| | | | |
|---|---|---|---|
| DE | 4424717 A1 | 1/1996 | |
| EP | 0859413 A2 | 8/1998 | |
| EP | 1246251 A2 | 10/2002 | |
| EP | 1450419 A2 | 8/2004 | |
| JP | 6265406 A | 9/1994 | |
| JP | 11271141 A | 10/1999 | |
| KR | 20030044699 A | 6/2003 | |
| WO | 2005036240 A1 | 4/2005 | |
| WO | 2005071770 A2 | 8/2005 | |
| WO | 2006040344 A1 | 4/2006 | |

OTHER PUBLICATIONS

International Search Report; PCT/EP2008/060191; Oct. 21, 2008; 2 pages.

Anghel, et al; "Performance of cryogenic micro-bolometers and calorimeters with on-chip coolers"; App. Phys. Lett. 78 (2001), 556-558.

Persano, et al.; "Polarization mode splitting in monolithic polymer microcavities"; Appl. Phys. Lett. 87, 031103, 2005; 1 page (abstract only).

Z. J. Cheng, Z. L. Peng, K. X. Chen, H. P. Chan, C. X. Yu, and P. L. Chu: Polymer-waveguide-based vertical coupler, Opt. Commun. 260 (2006), 511-513.

G. Hu, Y. Cui, B. Yun, C. Lu, and Z. Wang: A polymeric optical switch array based on arrayed waveguide grating structure, Opt. Commun. 279 (2007), 79-82.

L. Eldada and L. W. Shacklette: Advances in Polymer Integrated Optics, IEEE J. Sel. Top. Quantum Electron. 6 (2000), 54-68.

Press release from Aegis Semiconductor: "Aegis Semiconductor Awarded Patents for Tunable Optical Filter and Package"; Apr. 11, 2006; 2 pages; http://www.aegislightwave.com/publications/Aegis_OSA_MOIC_Sept2004.pdf.

D. Hohlfeld and H. Zappe: An all-dielectric tunable optical filter based on the thermo-optic effect, J. Opt. A, Pure Appl. Opt. 6 (2004), 504-511.

Robert Bosch GmbH—Automative Equipment; "Night Vision From Bosch Infrared Technology for more Convenience and Safety in the Dark"; Sep. 2005; http://www.bosch-presse.de/TBWebDB/en-US/Presstext.cfm?CFID=79300&CFTOKEN=11298611&Id=2442; 1 page.

COMSOL 3.2.0.304_Release date: Apr. 2006_, COMSOL Multiphysics GmbH; see http://www.comsol.de.

Continental—Pro.Pilot—Advanced Driver Assistance Systems; Continental Automotive GmbH 2001-2008; 1 page; http://www.siemensvdo.com/topics/propilot/night-vision.

Y. Terui, S. Ando: Control of thermo-optic coefficients and their polarization dependence in polyimide films formed on Si substrates, Department of Organic and Polymeric Materials, Tokyo Institute of Technology.

Grüner, J., et al.: Emission enhancement in single-layer conjugated polymer microcavities, J. Appl. Phys. vol. 80 (1), Jul. 1, 1996, 207-215.

B. Masenelli, S. Callard, A. Gagnaire, and J. Joseph: Fabrication and characterization of organic semiconductor-based microcavities, Thin Solid Films 364 (2000), 264-268.

FLIR Systems, Inc 2005; http://www.flirthermography.de/; 1 page.

FLIR Thermal Imaging Infrared Cameras; FLIR Systems, Inc. 2005; 1 page; http://www.flirthermography.com/cameras/all_cameras.asp.

Sage Technologies Ltd. 2006-2007; http://www.gosage.com/; 1 page.

Johnson, Steven G., et al.: Introduction to Photonic Crystals: Bloch's Theorem, Band Diagrams, and Gaps (But No Defects), Feb. 3, 2003; 16 pages.

N. Tessler, G. J. Denton, and R. H. Friend, Lasing from conjugated-polymer microcavities, Nature, London, 382 (1996), 695-697.

M. Theander, T. Granlund, D. Mikael Johanson, A. Ruseckas, V.Sundström, M. R. Andersson and O. Inganäs; Lasing in a Microcavity with an Oriented Liquid-Crystalline Polyfluorene Copolymer as Active Layer, Adv. Mater. 2001, 13, No. 5, 323-327.

L. Persano, A. Camposeo, P. Del Carro, E. Mele, R. Cingolani, and D. Pisignano, Low-threshold blue-emitting emitting monolithic polymer vertical cavity surface-emitting lasers, Appl. Phys. Lett. 89 (2006), 121111.

Optics.org; Microbolometers offer high resolution at room temperature; May 1, 2001; http://optics.org/articles/ole/6/5/5/1.

L. Persano, R. Cingolani, and D. Pisignano: Monolithic organic-oxide microcavities fabricated by low-temperature electron-beam evaporation, J. Vac. Sci. Technol. B 23(4) Jul./Aug. (2005), 1654-1658.

Autoliv Inc—What We Do—Night Vision System; Autoliv Inc. 2006; 1 page. http://www.autoliv.com/alv/connect/Home/What+We+Do/New%20Products/Night%20Vision%20System.

W. H. Wong, K. K. Liu, K. S. Chan, and E. Y. B. Pun: Polymer devices for photonic applications, Journal of Crystal Growth, 288 (2006), 100-104.

A. Llobera, G. Villanueva, V. J. Cadarso, V. Seidemann, S. Büttgenbach, and J. A. Plaza: Polymer Microoptoelectromechanical Systems: Variable Optical Attenuators and Accelerometers, Transducers & Eurosensors '07, The 14th International Conference on Solid-State Sensors, Actuators and Microsystems, Lyon, France, 2007, unpublished, p. 1079-1082.

Y. Noh, H. Lee, Y. Won, M. Oh: Polymer waveguide thermo-optic switches with -70 dB optical crosstalk, Opt. Commun. 258 (2006), 18-22.

Y. Noh, C. Lee, J. Kim, W. Hwang, Y. Won, H. Lee, S. Han, M. Oh: Polymer waveguide variable optical attenuator and its reliability, Opt. Commun. 242 (2004), 533-540.

D. M. Yeo and S. Y. Shin: Polymer-silica hybrid 1×2 thermooptic switch with low crosstalk, Opt. Commun. 267 (2006), 388-393.

M. B. J. Diemeer: Polymeric thermo-optic space switches for optical communications, Opt. Mater., Amsterdam, Neth. 9 (1998), 192-200.

Welcome to Redshift Systems—Redshift Systems Corporation 2006; 1 page. http://www.redshiftsystems.com/.

Road-Ready Night Vision at last—Wired.com 2010; 3 pages; http://www.wired.com/news/technology/0,70182-0.html.

F. Hide, M. A. Diaz-Garcia, B. J. Schwartz, M. R. Anderson, Q. Pei, and A. J. Heeger, Semiconducting Polymers: A New Class of Solid-State Laser Materials, Science 273 (1996), 1833-1836.

R. B. Fletcher, D. G. Lidzey, D. D. C. Bradley, M. Bernius, and S. Walker: Spectral properties of resonant-cavity, polyfluorene light-emitting diodes, Appl. Phys. Lett. 77, No. 9 (2000), 1262-1264.

Schmid, J. H., et al.: Subwavelength Grating Structures in Silicon-on-Insulator Waveguides, Hindaway Publ. Corp., Advances in Optical Technologies, vol. 2008, Article ID 685489.

Teledyne Judson Technologies—Product Details—A Teledyne Technologies Company; Jul. 17, 2008; http://www.judsontechnologies.com/prod.htm.

The Planck Satellite Website—Apr. 4, 2004; http://www.planck.fr/heading14.html.

G. Gülsen and M. Naci Inci, Thermal optical properties of TiO2, Opt. Mater., Amsterdam, Neth. 18 (2002), 373-381.

Regoliosi, P. et al.: Thermal tunability of monolithic polymer microcavities, Appl. Phys. Lett. 92 (2008), 253310.

Z. Zhang, P. Zhao, P. Lin, and F. Sun: Thermo-optic coefficients of polymers for optical waveguide applications, Polymer 47 (2006) 4893-4896.

M. W. Pruessner, T. H. Stievater, M. S. Ferraro, and W. S. Rabinovich: Thermo-optic tuning and switching in SOI waveguide Fabry-Perot microcavites, Opt. Express 15 (2007), 7557-7563.

H. Lin, H. Huang, S. Tsao: Tolerance analysis of 4×4 SU-8 polymer array waveguide grating, Opt. Commun. 250 (2005). 69-76.

XVision—Turn Night into Day—Commercial Advertising Literature—Bendix: Shell Sheet: XVision see: http://www.bendix.com 2002.

* cited by examiner

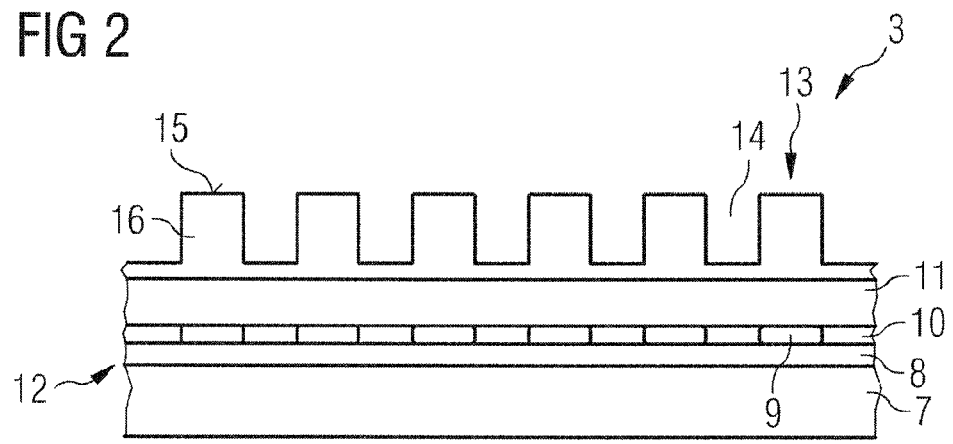
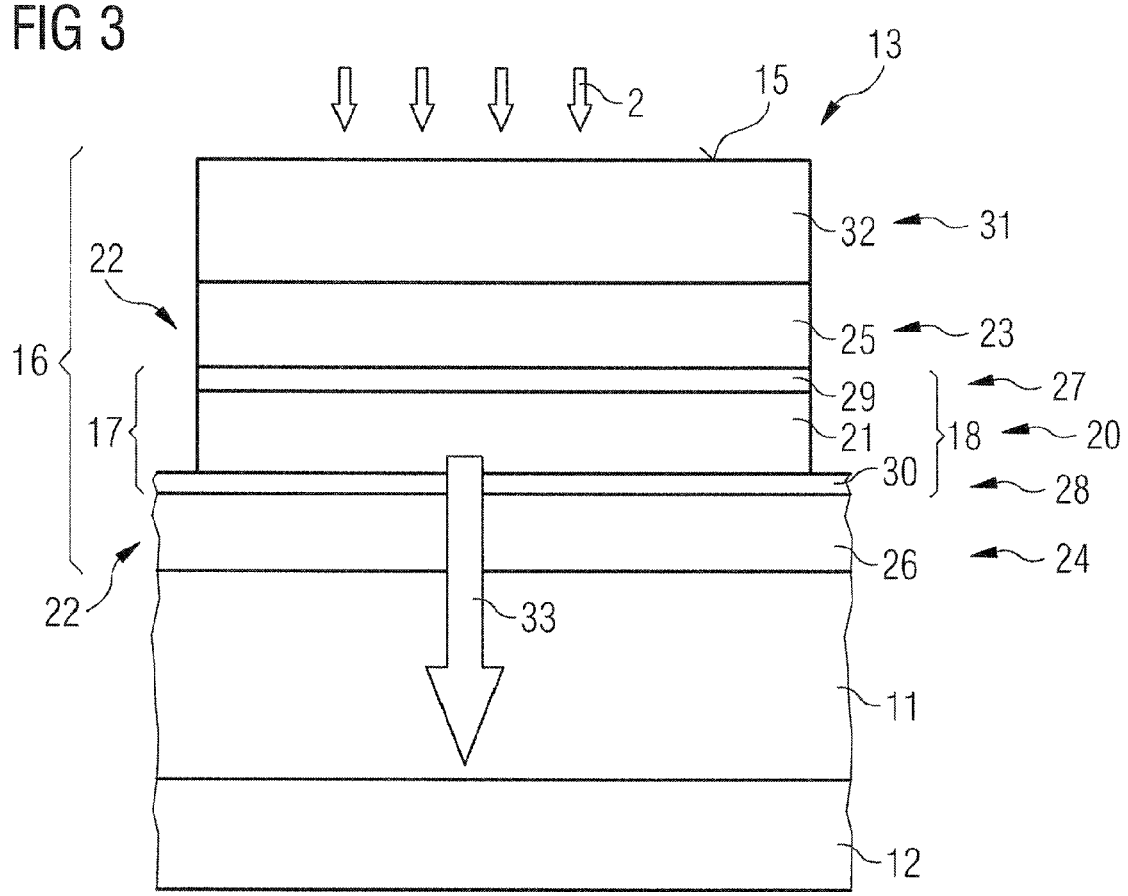

DEVICE FOR IMAGING AND METHOD FOR PRODUCING THE DEVICE

CROSS-REFERENCE TO RELATED APPLICATIONS

The present application is a continuation of pending International Application PCT/EP2008/060191 filed on Aug. 1, 2008, which designates the United States and claims priority from European patent application 07 015 154.3 filed on Aug. 2, 2007, the content of which is incorporated herein by reference.

FIELD OF THE INVENTION

The invention relates to a device for imaging the local distribution of at least one thermodynamic variable comprising:
a radiation emitter capable of emitting electromagnetic radiation, and
a filter for filtering electromagnetic radiation,
the emitter and the filter forming an arrangement adapted for modifying the electromagnetic radiation emitted by the emitter in dependency of the local distribution of at least one thermodynamic variable at the location of the arrangement.
The invention further relates to a method for producing the device.

BACKGROUND OF THE INVENTION

Such a device and a method for producing the device are known from US 2007/0023661 A1. The known device is arranged for detecting infrared radiation from a scene which is imaged on an array of thermally tunable filter elements. The known device further comprises a separate light source emitting light in the near infrared wavelength range. The light emitted by the light source is transformed into a collimated beam which is directed towards the array of filter elements. Since the infrared radiation from the scene is absorbed by the filter elements the temperature of the filter elements depends on the radiant flux of the infrared radiation originating from the scene. The temperature of the filter elements also affects the filter characteristic of the filter elements. In particular the transmission of the near infrared radiation through the pixel element is modified in dependency of the temperature of the filter element. By detecting the near infrared radiation transmitted through the filter elements an image of the temperature distribution and thus an image of the scene can be generated.

The known system suffers from a number of drawbacks. In praxis, the intensity of the near infrared radiation received by the detector is too low for taking pictures of a scene in a short period of time. Another disadvantage is that the filter elements are supported by thin posts, due to the required thermal isolation. In consequence, the filter elements are difficult to produce. A further disadvantage of the system is its bulkiness.

The known device can be used as an infrared (=IR) camera system. Infrared camera systems of this type may be used for various applications. For example, firefighters use infrared cameras to see through smoke, find persons, and localize hotspots of fires. With thermal imaging, power line maintenance technicians locate overheating joints and parts, a telltale sign of their failure, to eliminate potential hazards. Thermal imaging cameras are also installed in cars to aid the driver at night or in low visibility situations. Some physiological activities, particularly responses in human beings and other warm-blooded animals can also be monitored with thermographic imaging. Cooled infrared cameras can also be used in most major astronomy research activities. Military applications are also quite relevant.

The need and request for effective, sensitive, compact and relatively cheap thermal detection systems have became an important topic, in order to enable most of the mentioned applications, and to broaden their respective markets where they are already used.

Thermographic cameras can be divided into two types, those with cooled infrared image detectors and those with uncooled detectors. They differ in terms of fabrication, maintenance and performances.

Cooled detectors are contained in a vacuum-sealed cases and are cryogenically cooled, usually at 80 K—liquid nitrogen temperature—although cooling at 4 K is also possible at a much higher cost of the apparatus. The cooling increases their sensitivity since their own temperatures are much lower than that of the objects that they are suppose to measure. The drawbacks of cooled infrared cameras are that they are expensive both to produce and to maintain. Cooling and evacuating are in fact power- and time-consuming. The camera may need several minutes to cool down before starting to operate. Moreover the components capable of operating at lower temperature and pressure are generally bulky and expensive, making the whole system not easy to miniaturize in order to render it compact and portable. Despite such practical limitations, cooled infrared cameras provide superior image quality compared to uncooled ones and are thus used for applications requiring high sensitivity whereas the actual dimensions are not a problem, for instance in instruments for astronomical research. Examples of such devices include liquid helium cooled silicon bolometers, and a wide range of cheaper narrow gap semiconductor devices including indium antimonide, indium arsenide, HgCdTe, lead sulfide, lead selenide. Superconducting tunneling junction devices have been demonstrated as infrared sensors because of their very narrow gap. Further information on this type of detectors can be found, for instance, in ANGHEL et al.: Performance of cryogenic micro-bolometers and calorimeters with on-chip coolers, App. Phys. Lett. 78 (2001), 556-558.

On the other hand, uncooled thermal cameras use a sensor operating at ambient temperature, or a sensor stabilized at a temperature close to ambient using small temperature control elements like Peltier elements. An example for this type of detector can be found in US 2007/0176104. Uncooled detectors generally use sensors that detect infrared radiation by the change of resistance, voltage or current caused by the absorption of the infrared radiation. The measured variation is proportional to the intensity of absorbed radiation. Uncooled infrared sensors can be stabilized to an operating temperature to reduce image noise, but they are not cooled to low temperatures and thus do not require bulky, expensive cryogenic coolers. Such infrared cameras are therefore smaller, in some cases even portable and less costly. However, their resolution and image quality tend to be lower than the resolution and the image quality of infrared cameras with cooled detectors. Uncooled detectors are mostly based on pyroelectric and ferroelectric materials or microbolometer technology. In particular, a microbolometer is a specific type of bolometer, composed of an absorbing grid of vanadium oxide or amorphous silicon heat sensors on top of a corresponding grid of silicon. Infrared radiation strikes the grid and changes its electrical resistance. This resistance change is measured and converted into temperatures which can be represented graphically. The sensitivity is partly limited by the thermal conductance of the pixel. Most of the commercially available thermal cameras are based on microbolometer, but they are still too expensive to be used in other applications than in military, government, high class car segments or security.

WO 2005/071770 A2 discloses a green light-emitting micro cavity Organic Light Emitting Devices (=OLED). The OLED device comprises at least one light-emitting layer, a reflector and a semitransparent reflector respectively disposed on opposite side of the light-emitting layer. Those reflectors are arranged such that the light leaving the micro cavity OLED has a substantial green spectral component.

SUMMARY OF THE INVENTION

Proceeding from this related art, the present invention is based on the object of providing a device which allows visualizing the local distribution of at least one thermodynamic variable within a short period of time. The invention is further based on the object to provide a method for producing the device.

These objects are achieved by a device and a method having the features of the independent claims. Advantages embodiments and refinements are specified in claims dependent thereon.

In the device for imaging the local distribution of at least one thermodynamic variable, the emitter comprises at least one electroluminescent layer, the filter comprises at least one filter layer and the electroluminescent layer and the filter layer are integrated within a cohesive sequence of layers. In this context, the term cohesive sequence of layers shall be understood as meaning an uninterrupted sequence of layers hold together by adhesive forces between the layers. The adhesive forces can originate from the chemical bounds if one layer is deposited on top of the previous one. Since the emitter and the filter form an assembly embedded in a sequence of layers the light leaving the emitter can reach the associated filter without leaving the sequence of layers so that losses can be kept low since the number of boundaries is minimized. Thus, enough intensity will be available for performing the imaging in a short period of time.

In a preferred embodiment the thermodynamic variable is the temperature of the assembly formed by filter and emitter. Such a device is particularly suitable for monitoring temperature distributions and may also be used for imaging a scene on a detector.

If the device is used for a camera, the emitter and the filter form a radiation converting arrangement. The temperature of the radiation converting arrangement is varied in dependency of radiation in a first wavelength range focused on the radiation modifying arrangement and the emitter is emitting radiation within a second wavelength range. In this case, the assembly of filter and emitter works as a radiation converter, which converts the incident radiation in the first wavelength range into radiation in the second wavelength range. In particular, if the radiation in the second wavelength range is visible light, a detector for visible light can be used, so that the infrared camera system can be based on an usual CCD or CMOS detector.

In a further embodiment, the emitter and the filter are patterned such that the radiation emitter comprises a plurality of emitter elements and the filter comprises a number of filter elements. The emitter elements and the filter elements are respectively integrated into stacks of layers mounted on a substrate wherein each stack is associated with a pixel for imaging the local distribution of the at least one thermodynamic variable. By this arrangement, the pixels can be thermally, mechanically and optically decoupled.

In another embodiment, the device is provided with a detector comprising a plurality of detector elements, which define the pixel for imaging the local distribution of the at least one thermodynamic variable together with the filter elements and the emitter elements. The detector elements are preferably integrated in the sequence of layers which also forms the filter elements and the emitter elements.

In a further embodiment, the stacks comprising the emitter elements and the filter elements are separated by trenches so that the stacks are isolated with respect to each other. If the thermodynamic variable is a concentration of a medium surrounding the device, the trenches allow the medium to get in direct contact with the side walls of the stacks forming the pixels of the device. Thus, the diffusion length can be kept short. If the thermodynamic variable equals the temperature, the pixels can be thermally decoupled by the trenches so that each of the pixels can assume an individual temperature.

For the radiation converting arrangement of the emitter and the filter, various embodiments are possible. For example, the emitter can change its emission characteristic in dependency of the thermodynamic variable at the location of the emitter, whereas the transmission characteristic of the filter is kept constant. Such an arrangement is particularly suitable for embodiments, in which a thermodynamic variable is changed at the location of the emitter and particularly at the location of an emitter element. In another embodiment, the filter changes the transmission characteristic in dependency of the thermodynamic variable at the location of the filter and in particular of the filter element. This embodiment is particularly suitable for embodiments, in which a thermodynamic variable assumes different values at the location of the filter.

It is also possible to integrate the emitter or emitter element within a filter or an associated filter element. For instance, the filter element may be a Fabry-Perot comprising at least two reflectors arranged at opposite sides of the emitter element. This arrangement is appropriate for devices, in which the material used for the emitter element comprises a refractive index that is strongly dependent on the temperature.

The filter or filter element can, however, also be disposed in the sequence of layers between emitter and detector if a direct exchange between the environment and the emitter is required. In this case, the filter can be kept particularly simple in comparison to the case, in which the emitter element is embedded in the filter element.

The filter element can be based on so-called photonic crystals, in particular on one-dimensional photonic crystals as for instance Distributed Bragg Reflectors (=DBR). Such filter structures can be easily and reliable produced and provide predictable transmission characteristics.

The emitter element is preferably based on organic material. It has been found, that emitter elements based on organic materials have a particular strong thermo-optic coefficient so that temperature changes at the location of the emitter elements can be reliably detected.

The emitter element may be a so-called OLED whose thermo-optic coefficient is sufficient for detecting temperature changes at the location of the emitter element.

The emitter elements might also be Light Emitting Capacitance (=LEC). Even if the thermo-optic coefficient of these emitter elements is relatively low the thermal variation of the filter elements can compensate for the low thermo-sensitivity of the LEC.

The detector preferably is a CCD or a CMOS detector. Such devices, which detect light in the optical wavelength range, can be obtained at low costs and are widely available. These detectors can also be used as a basis for producing an infrared camera system by depositing a sequence of layers containing the emitter elements and the filter elements above the detector.

In this case, the temperature for depositing the required layers should be kept at a level which avoids any damage to the detector. If the emitter elements are based on organic materials, the temperature for the process steps can be kept sufficiently low so that the detector is not damaged during the deposition of the organic layers. Alternatively, the prefabricated emitter element can be brought into cohesion with the detector.

BRIEF DESCRIPTION OF THE DRAWINGS

Further advantages and properties of the present invention are disclosed in the following description, in which exemplary embodiments of the present invention are explained in detail based on the drawings:

FIG. 2 depicts a cross section through the detector of a sensor chip of the camera system from FIG. 1;

FIG. 3 shows an enlarged cross-sectional view of a stack of the sensor chip from FIG. 2;

DETAILED DESCRIPTION OF THE INVENTION

Figure 1:
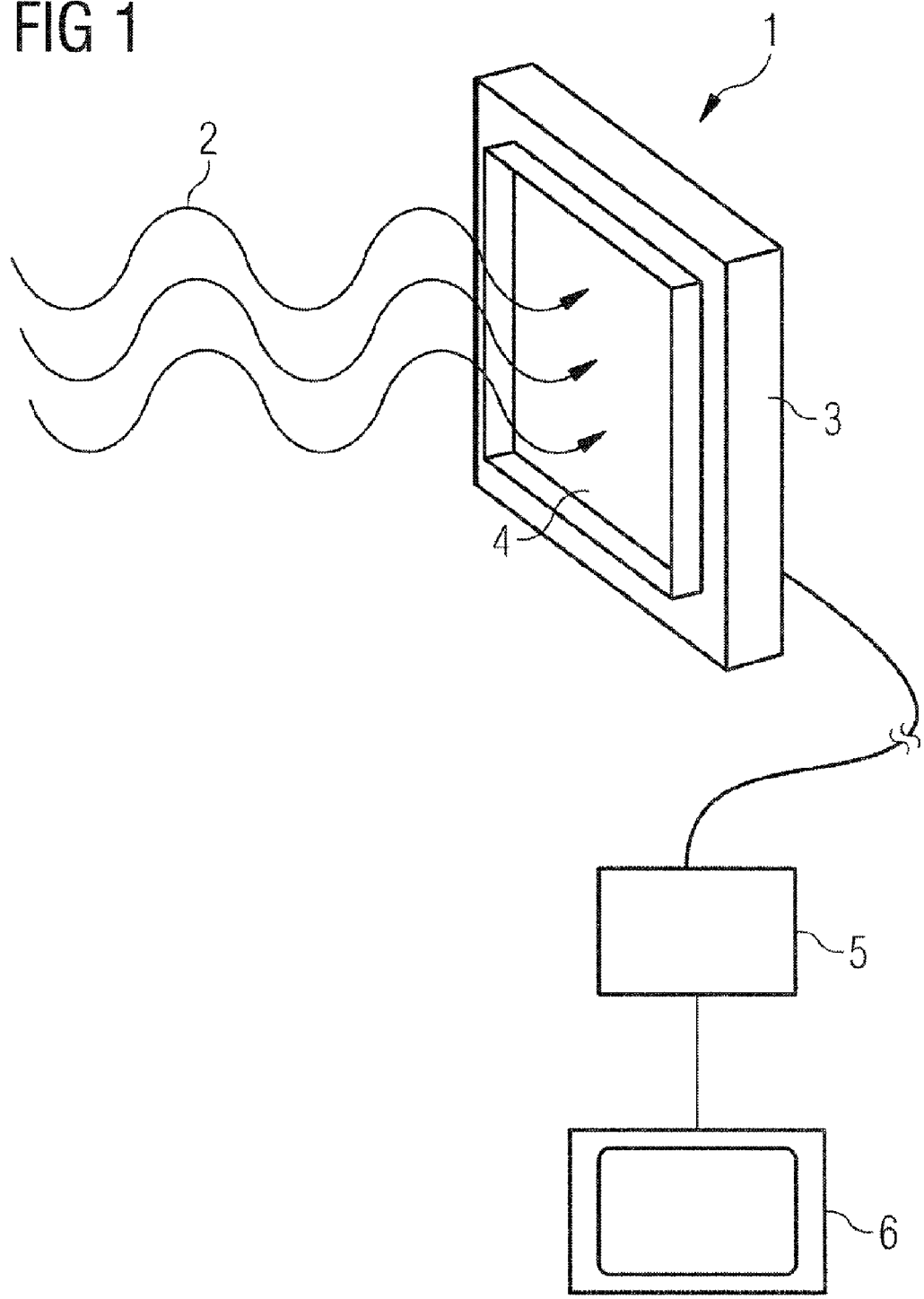
FIG. 1 shows an infrared camera system.

FIG. 1 shows an infrared camera system 1, for detecting infrared radiation 2. The infrared camera system 1 can be used to image a scene in the infrared wavelength range. The infrared wavelength range is the part of the electromagnetic spectrum between the visible range with wavelengths below 800 nm and the microwave range with wavelengths above 1 mm. For imaging the scene on a sensor chip 3 of the infrared camera system 1, an optical system is used that is not shown in FIG. 1. By the optical system, the scene is imaged on an image surface 4 of the sensor chip 3. The sensor chip 3 transforms the image of the scene on the image surface 4 into analog or digital image data which can be supplied to a control unit 5 connected to the sensor chip 3. In the embodiment of FIG. 1, the control unit 5 is further connected to a display unit 6, on which the image of the scene to be observed is displayed to a user of the infrared camera system 1.

FIG. 2 depicts a cross-section of the sensor chip 3. The sensor chip 3 comprises a substrate 7. On the substrate 7, a control layer 8 is provided which may comprise circuit elements for read-out and control of light-sensitive detector elements 9 disposed in a detection layer 10 above the control layer 8. The detection layer 10 is covered by a protective layer 11. The substrate 7, the control layer 8 and the detection layer 10 form a detector 12. The detector 12 is preferably sensitive to visible light and may be a CCD detector or a CMOS detector.

On the detector 12, a number of stacks 13 is provided. The stacks 13 are separated by trenches 14 such that each of the stacks 13 is disposed above an associated detector element 9 so that the array of stacks 13 corresponds to the array of detector elements 9. The outer surfaces 15 of the stacks 13 correspond to the image surface 4 of the sensor chip 3. As will be explained later in more detail, infrared light impinging on the outer surfaces 15 of the stacks 13 is converted into visible light by a Tunable Light Emitting Device (=TLED) 16. The visible light emitted by the TLED 16 is detected by the detector elements 9. The detector elements 9 and the stacks 13 of TLED 16 thus form together the pixels of the detector 12.

FIG. 3 is an enlarged cross-sectional view of a single stack 13 showing the structure of the TLED 16 in more detail.

The TLED 16 comprises an emitter 17 within an emitter layer 18, which forms emitter elements 19 within the stacks 13. The emitter layer 18 further comprises an electroluminescent layer 20, which emits light. Within the stacks 13, the electroluminescent layer 20 forms electroluminescent elements 21.

The TLED 16 further comprises an optical filter 22 which selects the wavelength of the light emitted by the electroluminescent layer 20. The optical filter 22 comprises two filter layers 23 and 24, which comprise the structure of Distributed Bragg Reflectors (=DBR). Within the stack 13 the filter layers 23 and 24 form filter elements 25 and 26. The reflector layers 23 and 24 are composed of several layers of materials having different refractive index, thus providing a selection of a transmission window for the light emitted by the electroluminescent layer 20. The reflector layers 23 and 24 are made from materials whose thermo-optic properties are temperature dependent, therefore the transmission window shifts according to the variation of the temperature.

The electroluminescent layer 20 is preferably contacted by contact layers 27 and 28, which form contacts 29 and 30 within the stack 13. The electroluminescent layer 20 and the contact layers 27 and 28 may form an organic light emitting diode, fabricated by deposition of at least one organic active material layer and evaporation and/or sputtering of top and bottom semitransparent metallic contact layers 27 and 28. Finally, the electroluminescent layer 20 and the contact layers 27 and 28 can also form a Light Emitting Capacitance (=LEC). Such devices are sometimes also known as electroluminescent foil. The contacts 29 and 30 can also be patterned in order to improve transparency.

The TLED 16 finally also comprises an absorbing layer 31, which form absorbing elements 32 within the stack 13. The absorbing layer 31 provides increased sensitivity to the environmental changes. The absorbing layer 31 is an optional layer, which can be used to increase the sensitivity of the TLED 16, and it is made of a material able to absorb infrared radiation 2 incident on the outer surface 15, thus changing the temperature of the absorbing layer 31. The heat generated in the absorbing layer 31 is then transmitted to the lower layers of the TLED 16. In other embodiments, such layer could be made sensitive to other environmental conditions thus allowing their detection. For instance, chemical processes in the absorbing layer 31 could also result in temperature changes within the absorbing layer 31.

In the embodiment depicted in FIG. 3, the electroluminescent layer 20 is embedded inside the tunable filter 22. The wavelength range of the light emitted by the electroluminescent layer 20 is chosen such that it lays in the transmission range of the optical filter 22, in which the electroluminescent layer 20 is embedded, and which provides also encapsulation for it. This wavelength range lies also within the sensitivity range of the detector 12. Thus the arrangement of emitter 17 and filter 22 represent an radiation converter which converts the incident infrared radiation 2 into visible light 33.

Figure 4:
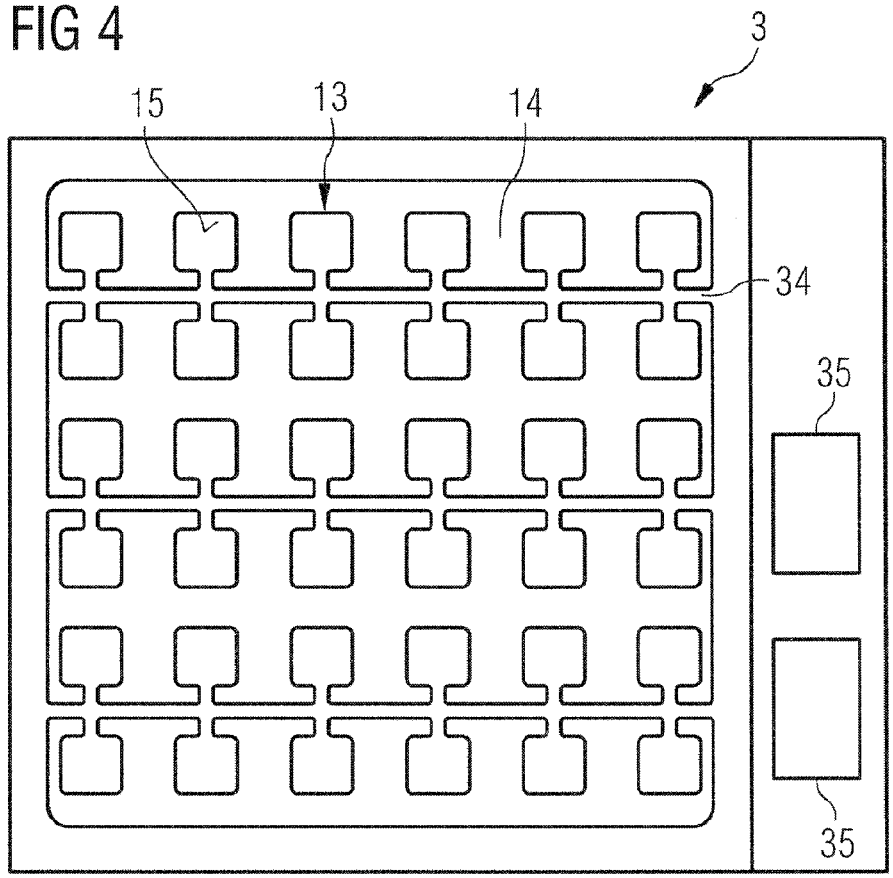
FIG. 4 shows a view from above on the sensor chip of FIGS. 2 and 3.

FIG. 4 is a view from above on the outer surface 15 of the sensor chip 3. As can be recognized from FIG. 3, the stacks 13 are connected to a web 34, which contains the conductors for supplying the required voltage to the contacts 29 and 30.

The conductors supplying the voltage to the contacts 29 and 30 can be contacted by contact pads 35 at the periphery of the sensor chip 3.

It should be noted that FIGS. 2 to 4 are not true to scale. The thickness of the electroluminescent layer 20 is roughly a multiple of $\lambda/2$ wherein $\lambda/2$ is the distance between transmission maxima of the filter 22. A typical value for the thickness of the electroluminescent layer ranges between 100 nm and 400 nm.

The filter layers 23 and 24 are generally composed of several layers with a thickness of $\lambda/4$ which results in a thickness between 50 and 200 nm. The contact layers 27 and 28 typically have a thickness around 10 nm in order to remain semitransparent.

For sensor chips 3 whose detector 12 is a usual CCD chip, the lateral extension of the pixels typically ranges between 3×3 µm for high resolution applications and 100×100 µm. If a usual CMOS chip is used as detector 12, the pixel size is typically 60×60 µm.

The detector 12 is generally produced using standard silicon technology. In some cases, process temperatures may even range up to 1300° C. Further process steps encompass heat treatments between 500° C. and 600° C. For forming the TLED 16, coating processes can be used, which entail temperatures in the range of 150° C. Thus, the functionality of the detector 12 will not be affected while the TLED 16 is formed using the detector 12 as a substrate.

Figure 5:
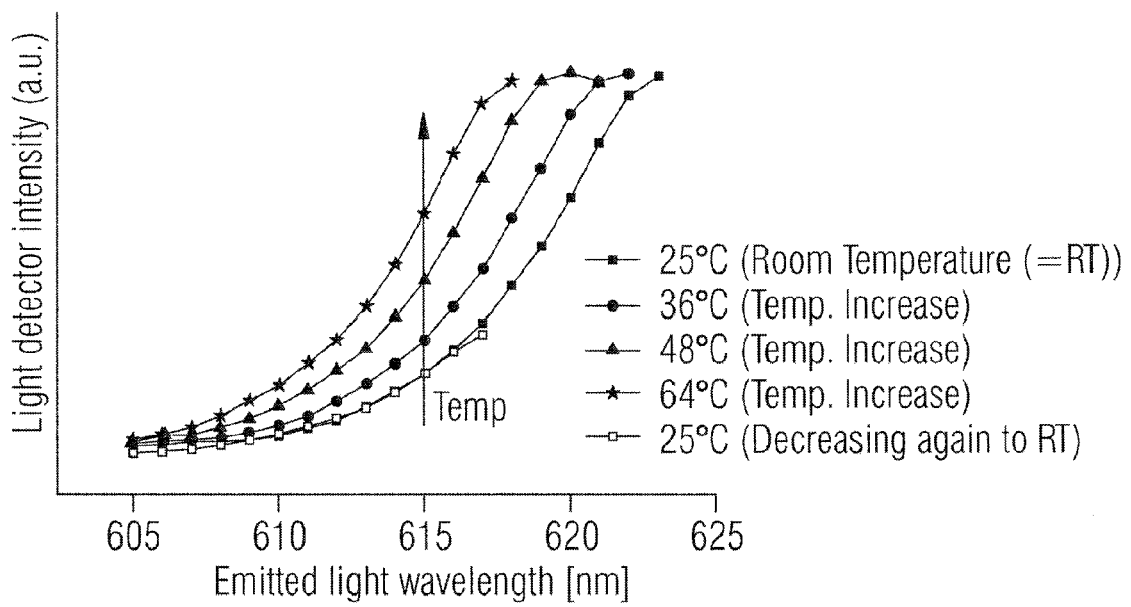
FIG. 5 is a diagram illustrating the transmission of a filter structure at various temperatures.

The working principle of the sensor chip 3 will be explained referring to FIG. 5. FIG. 5 contains various emission spectra as received by the detector 12 at various temperatures of the TLED 16. It should be noted that the emission spectra shift to shorter wavelength with raising temperature of the TLED 16. The temperature shift of the emission spectrum is due to the fact that the filtering behavior of the optical filters 22 changes. Since the shift of the spectrum results also in a variation of the intensity detected by the detector 12, the change of the temperature can be detected by measuring the intensity change of the light detected by the detector 12.

The sensitivity of the device with respect to the variation of the temperature can be defined as the ratio of the variation of the detector response to the temperature change. The variation of the detector response is due to the change of the temperature dependent optical properties of the filter.

An estimation of the sensitivity of the system has been performed using monochromatic light. Unfocused light coming out of a monochromator was sent through an optical filter structure to a CMOS detector, and the change of the detector signal was determined as a function of the temperature of the filter.

The sensitivity of the system was estimated by considering the overall change of the intensity of all the pixels involved. Therefore the signals of all pixels were summed up. In an experiment performed at room temperature an intensity change corresponding to a sensitivity level of 40 mK was determined for a single read-out cycle with an integration time less than 1 microsecond.

For demonstrating the functionality of the TLED 16, the thermal tunability of a structure similar to TLED 16 was studied. The structure used in the experiment comprises a microcavity formed by two reflectors corresponding to the filter layers 23 and 24. In the microcavity a polymer was embedded.

The reflectors of the microcavity were DBRs realized by reactive electron-beam evaporation at low temperature of a few couple of thin films of titanium and silicon oxides. The structural scheme of the microcavity was the same as reported in PERSANO, L.; MELE, E.; CINGOLANI, R. and PISIGNANO, D.: Polarization mode splitting in monolithic polymer microcavities, Appl. Phys. Lett. 87, 031103, 2005, but different layer thicknesses were chosen in order to match the emission spectrum of the embedded polymer.

The bottom DBR deposited onto a glass substrate was composed of 8.5 pairs of 90 nm $SiO_2$ and 60 nm $TiO_2$ layers, respectively, as low and high refractive index media. The layer corresponding to the electroluminescent layer was formed by an 150 nm thick active organic semiconductor layer. The layer was formed by (poly[(9,9-dioctyl-2,7-divinylene-fluorenylene)alt-co-{2-methoxy-5-(2-ethyl-hexyloxy)1,4-phenylene}], American Dye Source) which was directly spin cast from chloroform solution onto the bottom DBR. The top mirror, composed of 10.5 pairs of $SiO_x/TiO_x$ (95/65 nm), was then evaporated on the cavity layer at low temperature. In order to check if the emission of the active material was also changing with temperature, a reference sample has been prepared where a polymer film was spin cast onto the same glass substrate used for the microcavity.

Normal incidence transmission measurements at room temperature were performed by a spectrophotometer (JASCO model V570). To carry out temperature-dependent transmission measurements, the cavity glass substrate was attached to a Peltier element by thermal conducting tape. The temperature change imposed by the heater was recorded by both a Pt100 thermometer contacted on the sample and an IR camera (FLIR SC640). The transmission measurements were then performed using a 100 W quartz halogen lamp and a monochromator (Spectra Physics MC256) and collecting the light passing through the microcavity by a photodetector.

The signal of the photodetector was not corrected for the setup responsivity, nevertheless it was still possible to observe the main cavity features and their shift. Successively, photoluminescence (=PL) measurements were performed by exciting the sample at 402.8 nm using a diode laser with an incidence angle of 45°. The emission was analyzed by a grating monochromator and detected with a charge coupled device camera. The bandpass of the system for these measurements was 0.16 nm. The heating of the samples was provided by a Peltier element contacted to the cavity glass substrate by thermal conducting paste, and the temperature was measured by means of a Pt100 attached directly aside of the sample.

Figure 6:
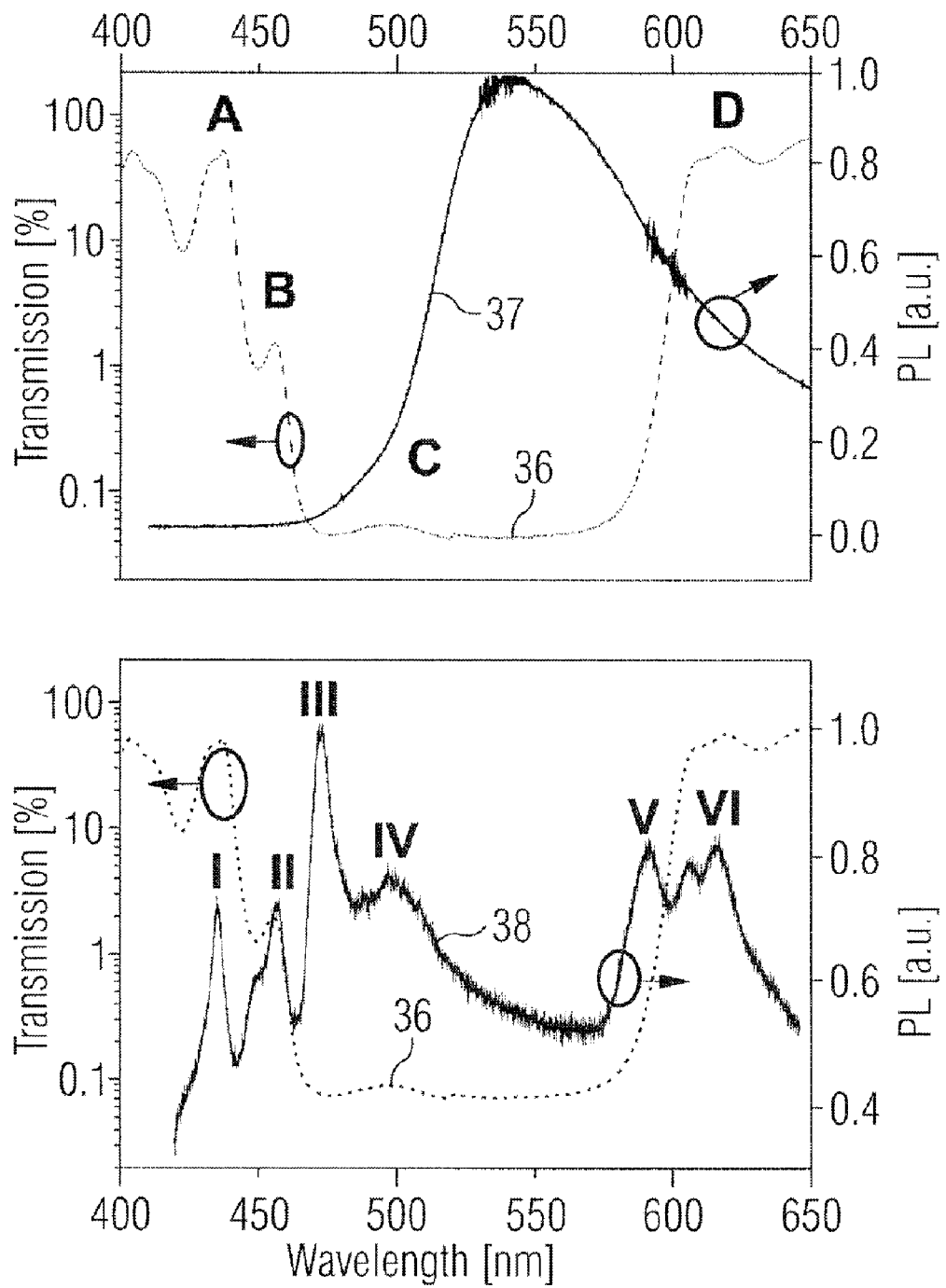
FIG. 6 shows a diagram with a normal incidence transmission measurement of a microcavity compared both to the photoluminescence (=PL) spectrum of a polymer collected from a reference sample (upper plot) and to the PL spectrum of the microcavity (lower plot)

In FIG. 6, the normal incidence transmission characteristic 35 of the cavity is compared both to the PL spectrum 37 of the polymer collected from the reference sample (upper plot) and to the PL spectrum 38 of the microcavity (lower plot), all collected at room temperature. The upper plot in FIG. 6 shows the room temperature PL spectrum 37 of the conjugated polymer by a continuous line and a vertical scale on the right. The upper plot further shows the transmission characteristic 35 of the microcavity with a dotted line and a vertical scale on the left. The capital letters A to D label the main features. The lower plot shows the transmission characteristic 35 of the upper plot compared to a room temperature PL spectrum 38 of the polymer embedded in the cavity wherein the PL spectrum 38 is presented by a continuous line and a vertical scale on the right. The roman numbers label the peaks of the PL spectrum 38: the association among some peaks of the PL spectrum 38 and the peaks in the transmission characteristic 35 of the microcavity I-A, II-B, IV-C and VI-D can easily be recognized.

It is well evident that the emission of the polymer takes place in the range where the transmission of the cavity is low. Therefore, the actual emission of the polymer through the microcavity is modulated in a very precise way by the features of the microcavity itself. The peaks in the PL spectrum 38 of the microcavity perfectly match those of the transmission, with a couple of extra emission features which are related to the convolution of the polymer fluorescence and the cavity transmission spectra, i.e., to the stop-band enhancement of the relative spontaneous emission from the polymer.

In order to look for the shift of the observable peaks in both transmission (FIG. 7) and emission (FIG. 8), temperature-dependent measurements were performed. The temperature was increased in the range between 25° C. (room temperature) and 65° C. by steps of approximately 10° C. each, leaving sufficient time between steps to reach thermal stability.

Figure 7:
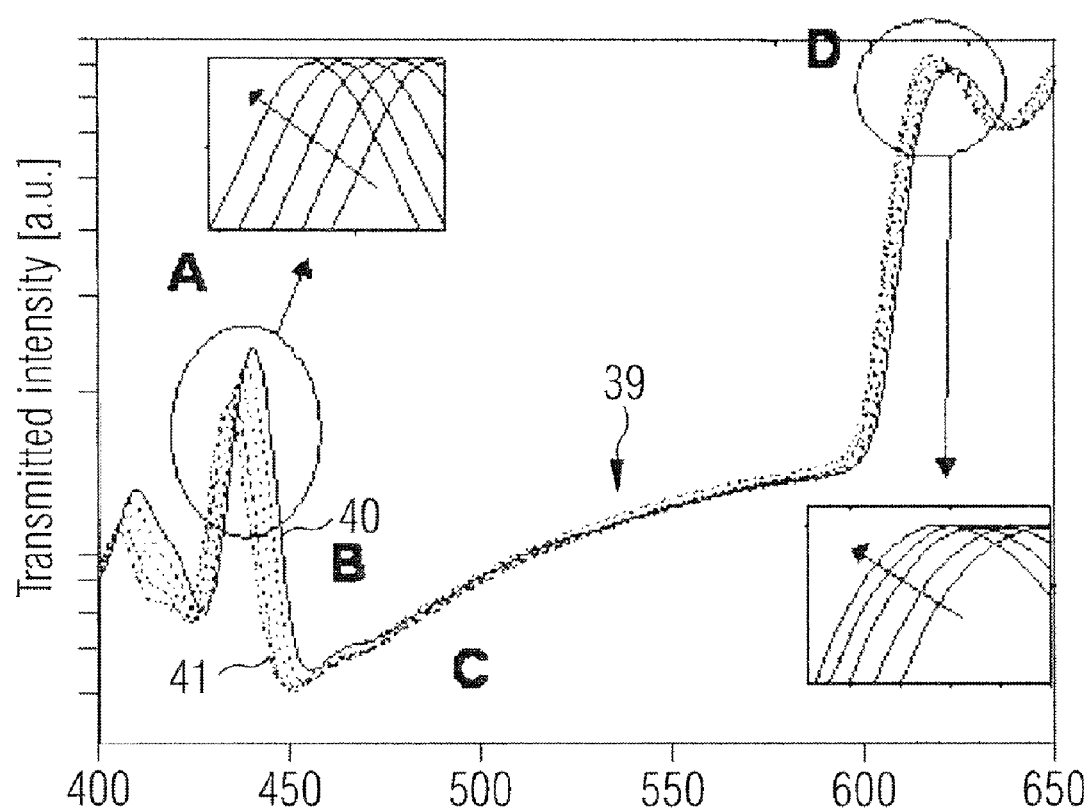
FIG. 7 shows the transmission spectra of the microcavity as a function of the temperature.

FIG. 7 shows transmitted spectra 39 of the microcavity as a function of the temperature: a continuous line plot 40 shows a reference spectrum measured at room temperature (about 25° C.), the dotted plots 41 represent the spectra 39 recorded while increasing temperature with steps of 10° C. until the final value of 65° C. The insets zoom in the regions around the peaks on a normalized plot, the arrows in the insets indicate increasing temperatures.

Figure 8:
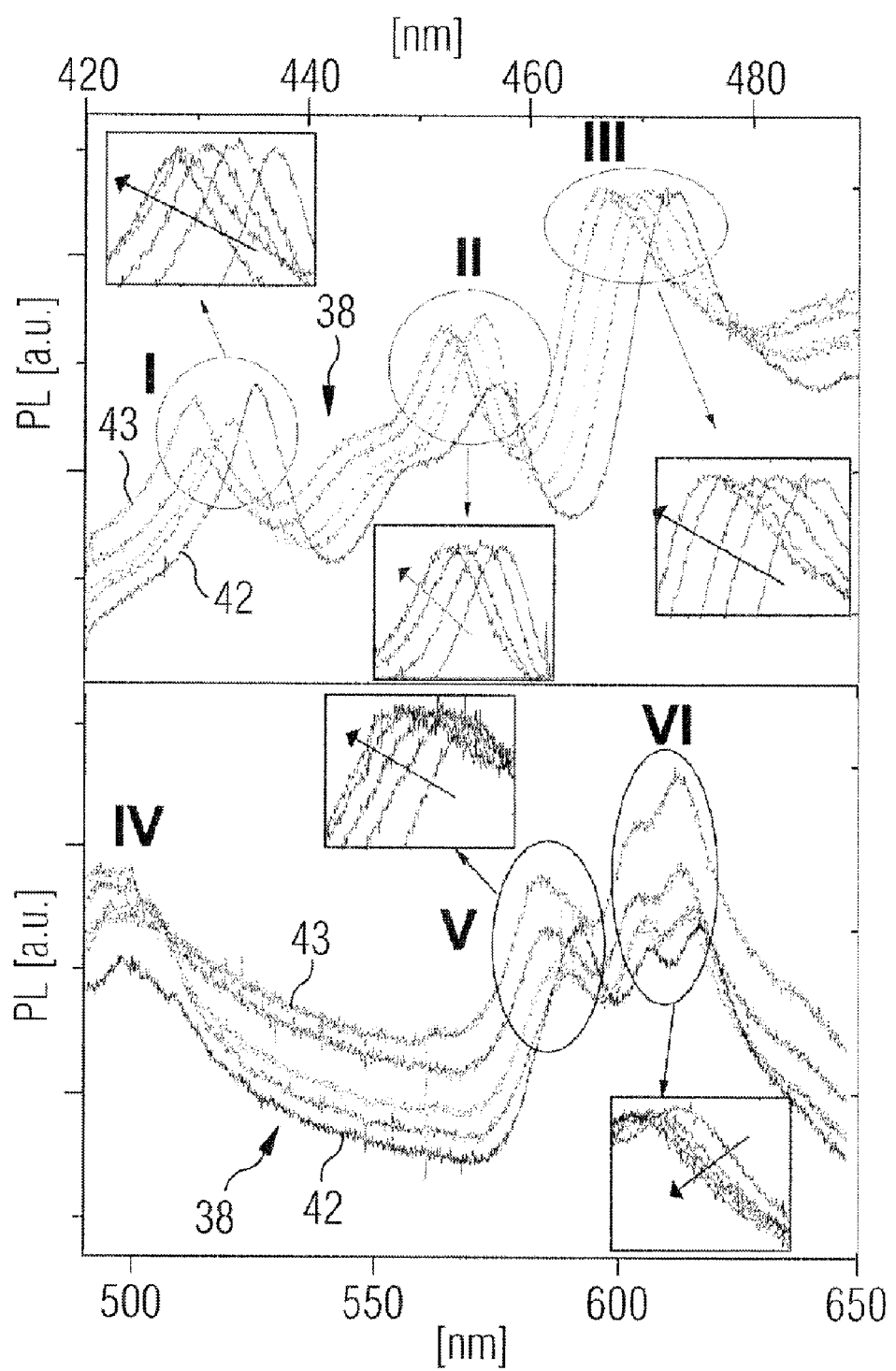
FIG. 8 depicts the PL spectra of the polymer embedded in the microcavity for various temperatures.

FIG. 8 depicts the PL spectra 38 of the polymer embedded in the microcavity for various temperatures: the continuous line plot 42 shows the reference spectrum measured at room temperature (25° C.), the dotted plots 43 represent the spectra recorded while increasing temperature with steps of about 10° C. until the final value of 60° C. The insets zoom in the region around the peaks, the arrows in the insets indicate increasing temperatures.

The PL spectra collected from the reference sample showed no significant temperature dependency. Therefore any behavior observed in the microcavities can exclusively be ascribed to the temperature variations of the material refractive indices. All the recognizable features of both transmission characteristics and PL spectra are blueshifted upon increasing the temperature, which corresponds to negative thermo-optic coefficient. We found that the shift is linear with the temperature in all the cases. A linear fit provides the relative change with temperature of the peak wavelength ($\Delta\lambda/\Delta T$). The results are presented in Table I, the spreading being due to the errors in the determination of the peaks positions. The features appearing both in the transmission characteristics and in the PL spectra exhibit similar variation with temperature, which provides a cross-check of the reliability of the results.

Simulations were carried out to infer the values of the thermo-optic coefficient of the light-emitting polymer from the reported measurements by the program COMSOL 3.2B.19. The thermo-optic coefficient defined as the change in refractive index of a material with temperature is due to the combined effect of the geometrical change in the material due to thermal expansion, which induces a change in the density, and the intrinsic change related to the variation of the polarizability with the temperature. The thermal expansion coefficients for oxides can be neglected since they are at least one order of magnitude less than the intrinsic effect ($10^{-6}$/K compared to $10^{-4}$/K or $10^{-5}$/K). Instead, in the case of polymers, thermal expansion plays the most significant role, which also implies that such coefficients are negative as confirmed by the measurements described above.

For the microcavity devices, we also have to take into account that the light emitting polymer is embedded in the cavity and thus its calculated thermo-optic coefficient should be taken as an effective one, incorporating both the intrinsic change of the refractive index and the geometrical changes induced by the thermal expansion. The simulation program allows to define the optical transmission and reflection through several layers with different refraction indices and thus to calculate transmission spectra in the range of interest. The calculation was performed by changing the refraction indices of the layers in order to fit the measured variation of the transmission spectra. In particular, values of the thermo-optic coefficients of titanium oxides and silicon oxides reported in literature were used as fixed parameters and the only free fitting parameter was the polymer thermo-optic coefficient.

The simulations confirmed the linear behavior and thus the reliability of the linear fitting. Values for the effective thermo-optic coefficient were derived, corresponding to the different peaks of the transmission spectrum, obtaining values in the range between $-(2.05\pm0.13)10^{-3}$/K and $-(6.32\pm0.48)10^{-3}$/K, which are at least one order of magnitude higher than the $TiO_2$ ones. This result confirms the expected high value of the polymer thermo-optic coefficient and it implies that the tuning of the emission is mostly defined by the polymer cavity layer. The higher thermo-optic coefficient allows also a higher bandwidth $\Delta f$ of the filter 21. Since the signal-to-noise ratio goes with $\sqrt{\Delta f}$, a better signal-to-noise ratio can be obtained within the same integration time.

A problem, which could arise using an OLED based on a polymer embedded in a cavity, is the self heating due to the power dissipation of the operation of the OLED, which could mask the actual heating due to the absorption of infrared radiation. Actually, the OLEDs operate at low voltages around 5 V and with low current in the order of a few mA, so the dissipated power is limited to tens of mW.

In order to check the influence of self-heating, the actual temperature of an OLED surface was measured by means of an IR camera. The OLED was a typical one, where the active polymer was MEH-PPV spun on an ITO anode with Al cathode evaporated. It operates with a threshold voltage of 4.5 V and a current of 5 mA. The camera was not able to detect any significant variation of the temperature. That means that the OLED remains at room temperature during the five minutes of operation.

The infrared camera system 1 can be modified in various ways.

Figure 9:
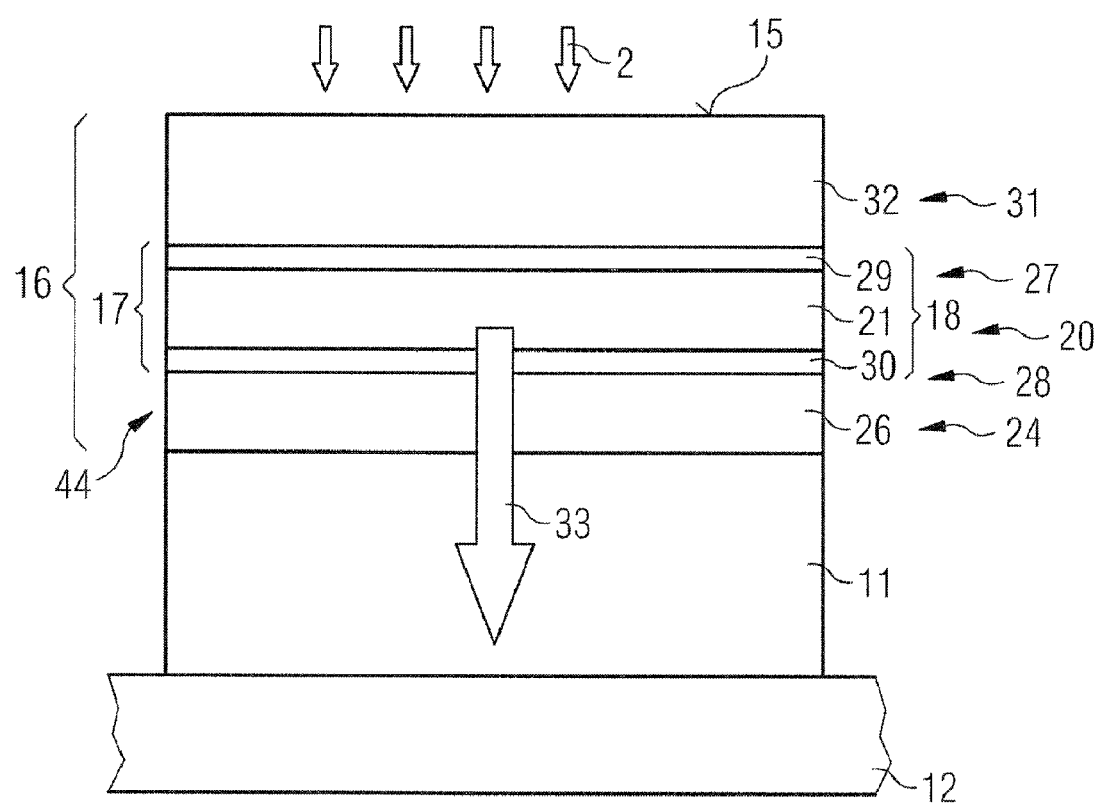
FIG. 9 shows a cross section of a modified pixel of the sensor chip of FIG. 1.

FIG. 9 shows a modified embodiment of the stack 13. In this embodiment, a TLED 16 comprises a filter 44 which is disposed between the electroluminescent layer 20 and the detector 12. The filter 44 has internally the structure of a Fabry-Perot filter. In this embodiment, the distance between the absorbing layer 31 and the electroluminescent layer 20 is reduced, assuring a better exchange between environment and electroluminescent layer 20. Results from simulations show that the working principle and the sensitivity do not change significantly, with the advantage of saving one of the two production cycles which are needed for producing the two filter layers 23 and 24, since only one production cycle is needed for the production of the filter 44.

It should further be recognized that, in the embodiment according to FIG. 9, the trenches 14 extend through the protective layer 11, thus providing a better mechanical, thermal and optical decoupling of the stacks 13.

The layer containing the filter elements and the emitter elements can be patterned as depicted in FIGS. 4 and 9. However, the trenches 14 can also be omitted so that the layers forming the TLED 16 extend at least over a part of the detector 12 covering a plurality of detector elements 9. In particular, the stacks 13 can each extend over a plurality of detector elements 9.

In some cases it might also be possible to omit the protective layer 11 if the processes used for the formation of the TLED 16 leave the detector 12 unaffected even without the protective layer 11.

It is further possible to produce the TLED 16 on a separate substrate that is transparent for infrared radiation. Before the detector 12 and the TLED 16 are combined the assembly containing the TLED 16 is flipped over and mounted on the detector 12 in an upside down direction.

Further modifications relate to the filter layers 23 and 24. Instead of DBRs, which are one-dimensional photonic crystals, also two- or three-dimensional crystals can be used. Besides these reflectors also other reflective structures can be used.

Besides the TLED 16 emitting incoherent light also coherent light source might be used. For example, it might be possible to replace the TLED 16 by a light source emitting coherent light.

The light emitted by the TLED 16 might also be modulated by varying the voltage applied to the contacts 29 and 30. Thus, a lock-in detection may be performed which reduces the influence of ambient light which might arrive at the detector 12.

Furthermore, it might also be possible to provide an additional filter layer between the TLED 16 and the detector 12 for narrowing down the bandwidth of the light detected by the detector 12.

The imaging systems described herein provide a number of advantages, since they are compact and reliable imaging system, which can be produced easily and at low costs. The imaging systems are particularly suitable for the acquisition of thermal images. But in principle the imaging systems may also be used for detecting other environmental changes, for example humidity or gas concentration, and for representing them as images on a display.

The imaging systems are complete integrated devices with reduced fabrication steps, costs and difficulties, at the same time comprising smaller dimensions, higher compactness and robustness. It is therefore expected to provide the sensitivity of most conventional infrared imaging systems while maintaining the dimension slightly larger and costs slightly higher than a standard CMOS detector array.

A further advantage of the imaging system is that the detector can be kept at room temperature so that there is no need for cooling as with some conventional infrared camera systems which require operation at cryogenic temperatures.

Possible applications of the imaging system are in the fields of IR detection, in particular in connection with fire-fighting operations, military and police target detection and acquisition, automotive applications and pollution detection.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds or groups described in conjunction with a particular aspect, embodiment or example of the invention are to be understood to be applicable to any other aspect, embodiment or example described herein unless incompatible therewith.

TABLE I

| Transmission peaks | Δλ/ΔT (nm/° C.) | PL peaks | Δλ/ΔT (nm/° C.) |
|---|---|---|---|
| A | −0.169 ± 0.006 | I | −0.169 ± 0.017 |
| B | Not measurable | II | −0.139 ± 0.012 |
|  |  | III | −0.179 ± 0.006 |
| C | Not measurable | IV | Not measurable |
|  |  | V | −0.172 ± 0.011 |
| D | −0.145 ± 0.009 | VI | −0.153 ± 0.014 |

What is claimed is:

1. A device for imaging the local distribution of at least one thermodynamic variable comprising:
   a radiation emitter capable of emitting electromagnetic radiation, and
   a filter for filtering electromagnetic radiation,
   the emitter and the filter forming an arrangement adapted for modifying the electromagnetic radiation emitted by the emitter in dependency of the local distribution of at least one thermodynamic variable at the location of the arrangement,
   wherein
   the emitter comprises at least one electroluminescent layer, the filter comprises at least one filter layer, and
   the electroluminescent layer and the filter layer are integrated within a cohesive sequence of layers, and
   wherein the filter comprises an array of filter elements the radiation emitter comprises a plurality of emitter elements and wherein the emitter elements and the filter elements are respectively integrated into stacks of layers mounted on a substrate, each stack forming a pixel for imaging the local distribution of the at least one thermodynamic variable.

2. The device according to claim 1, wherein the thermodynamic variable is the temperature.

3. The device according to claim 2, wherein the temperature is varied in dependency of the absorption of radiation in a first wavelength range, and wherein the emitter is emitting radiation within a second wavelength range.

4. The device according to claim 3, wherein the first wavelength range is an infrared wavelength range and the second wavelength range is a visible wavelength range.

5. The device according to claim 1, wherein the stacks are separated by trenches.

6. The device according to claim 1, wherein the device is provided with a detector comprising detector elements.

7. The device according to claim 1, wherein the emitter element changes the emission characteristic in dependency of the thermodynamic variable at the location of the emitter element.

8. The device according to claim 1, wherein the filter element changes the transmission characteristic in dependency of the thermodynamic variable at the location of the filter.

9. The device according to claim 1, wherein the emitter is integrated into the filter.

10. The device according to claim 1, wherein the filter is disposed between the emitter and the detector.

11. The device according to claim 1, wherein the filter comprises Fabry-Perot-structures having at least two reflectors.

12. The device according to claim 1, wherein the filters comprise the structure of photonic crystals.

13. The device according to claim 1, wherein the emitter is based on an organic material.

14. The device according to claim 13, wherein the emitter has the structure of an organic light emitting device.

15. The device according to claim 1, wherein the emitter has the structure of a light emitting capacitance.

16. The device according to claim 1, wherein the at least one electroluminescent layer is contacted by contact layers.

17. A device for imaging the local distribution of at least one thermodynamic variable comprising:
- a radiation emitter capable of emitting electromagnetic radiation, and
- a filter for filtering electromagnetic radiation,
- the emitter and the filter forming an arrangement adapted for modifying the electromagnetic radiation emitted by the emitter in dependency of the local distribution of at least one thermodynamic variable at the location of the arrangement, wherein
- the emitter comprises at least one electroluminescent layer,
- the filter comprises at least one filter layer, and
- the electroluminescent layer and the filter layer are integrated within a cohesive sequence of layers, wherein the device is provided with a detector comprising detector elements, and wherein the detector elements are respectively associated with the filter elements and the emitter elements.

18. A method for producing an imaging device, the method comprising the method steps:
- preparing a detector with an array of detector elements on a substrate;
- providing an emitter and a filter which form an arrangement for modifying electromagnetic radiation detected by detector, wherein
- the emitter and the filter are provided in a sequence of layers on the detector,
- the emitter is made of organic material, and
- the layers associated with the detector assume a lower temperature during the production of the filter and the emitter than during the production of the detector.

19. The method according to claim 18, wherein the detector is covered by a protective cover on which the sequence of layers forming the emitter and the filter is disposed.

* * * * *